(12) United States Patent
Borawski et al.

(10) Patent No.: US 12,190,335 B2
(45) Date of Patent: Jan. 7, 2025

(54) METHODS AND APPARATUS TO GENERATE REFERENCE SIGNATURE ASSETS FROM METER SIGNATURES

(71) Applicant: The Nielsen Company (US), LLC, New York, NY (US)

(72) Inventors: Albert T. Borawski, Oldsmar, FL (US); Geetanjali Arya, New York, NY (US); Satish Kumar Kukunuru, Tampa, FL (US)

(73) Assignee: The Nielsen Company (US), LLC, New York, NY (US)

( * ) Notice: Subject to any disclaimer, the term of this patent is extended or adjusted under 35 U.S.C. 154(b) by 343 days.

(21) Appl. No.: 17/515,152

(22) Filed: Oct. 29, 2021

(65) Prior Publication Data

US 2023/0138064 A1 May 4, 2023

(51) Int. Cl.
*H04H 60/37* (2008.01)
*G06F 16/48* (2019.01)
*G06F 16/903* (2019.01)
*G06Q 30/0201* (2023.01)

(52) U.S. Cl.
CPC ......... *G06Q 30/0201* (2013.01); *G06F 16/48* (2019.01); *G06F 16/90344* (2019.01)

(58) Field of Classification Search
None
See application file for complete search history.

(56) References Cited

U.S. PATENT DOCUMENTS

| | | | |
|---|---|---|---|
| 4,677,466 A | 6/1987 | Lert, Jr. et al. | |
| 5,481,294 A | 1/1996 | Thomas et al. | |
| 7,460,684 B2 | 12/2008 | Srinivasan | |
| 9,438,940 B2 | 9/2016 | Nelson | |
| 9,548,830 B2 | 1/2017 | Kariyappa et al. | |
| 9,668,020 B2 | 5/2017 | Nelson et al. | |
| 10,200,546 B2 | 2/2019 | Nelson et al. | |
| 2005/0232411 A1 | 10/2005 | Srinivasan et al. | |

(Continued)

OTHER PUBLICATIONS

United States Patent and Trademark Office, "Non-Final Office Action," in connection with U.S. Appl. No. 17/959,043, mailed on Feb. 16, 2023, 07 pages.

(Continued)

*Primary Examiner* — Christopher B Robinson

(57) ABSTRACT

Methods, apparatus, systems, and articles of manufacture to generate reference signature assets from meter signatures are disclosed. Example apparatus disclosed herein include a signature comparator to compare meter signature strings with search signature strings to identify a first fragment match result, which is associated with a sequence position within a first media represented by the search signature strings included in the first fragment match result, and which is also associated with a length of the first media. Disclosed example apparatus also include candidate signature asset generation circuitry to generate a candidate signature asset from a meter signature sequence based on the sequence position and the length of the first media, and store the candidate signature asset in a candidate pool associated with the first media. Disclosed example apparatus further include reference signature asset identification circuitry to identify a reference signature asset from the candidate pool to represent the first media.

20 Claims, 11 Drawing Sheets

(56) References Cited

U.S. PATENT DOCUMENTS

| | | |
|---|---|---|
| 2006/0153296 A1 | 7/2006 | Deng |
| 2006/0184961 A1 | 8/2006 | Lee et al. |
| 2006/0195861 A1 | 8/2006 | Lee |
| 2007/0274537 A1 | 11/2007 | Srinivasan |
| 2008/0091288 A1 | 4/2008 | Srinivasan |
| 2008/0276265 A1 | 11/2008 | Topchy et al. |
| 2010/0131970 A1 | 5/2010 | Falcon |
| 2012/0117584 A1 | 5/2012 | Gordon |
| 2013/0160042 A1 | 6/2013 | Stokes et al. |
| 2015/0363420 A1* | 12/2015 | Garland ............... H04N 21/854 707/692 |
| 2016/0055606 A1 | 2/2016 | Petrovic et al. |
| 2016/0328398 A1* | 11/2016 | Adams .................... G06F 16/48 |
| 2017/0245009 A1* | 8/2017 | Nielsen .............. H04N 21/4394 |
| 2018/0005038 A1* | 1/2018 | Granström ........... G06V 10/809 |
| 2019/0037257 A1* | 1/2019 | Nelson ............. H04N 21/44008 |
| 2019/0079961 A1* | 3/2019 | Chen ................. H04N 21/4667 |
| 2020/0145721 A1* | 5/2020 | Tapse ............... H04N 21/23418 |

OTHER PUBLICATIONS

United States Patent and Trademark Office, "Non-Final Office Action," in connection with U.S. Appl. No. 18/463,623, mailed on Apr. 22, 2024, 06 pages.

* cited by examiner

METHODS AND APPARATUS TO GENERATE REFERENCE SIGNATURE ASSETS FROM METER SIGNATURES

FIELD OF THE DISCLOSURE

This disclosure relates generally to media monitoring and, more particularly, to methods and apparatus to generate reference signature assets from meter signatures.

BACKGROUND

Presentation of media to users can be monitored through the use of signatures for media identification. In some examples, signature-based media monitoring uses media signatures generated by a device meter to identify and track the media presented by a device. The meter signatures are compared against a database of reference (e.g., identified) media and their corresponding reference signatures. When a match is found between one or more reference signatures and one or more meter signatures, the media presented by the device can be identified based on the reference media information associated with the matching reference signature(s). Media signatures can take many forms (e.g., a series of digital values, a waveform, etc.), but are typically representative of some aspect of the monitored media signals.

Figure 1:
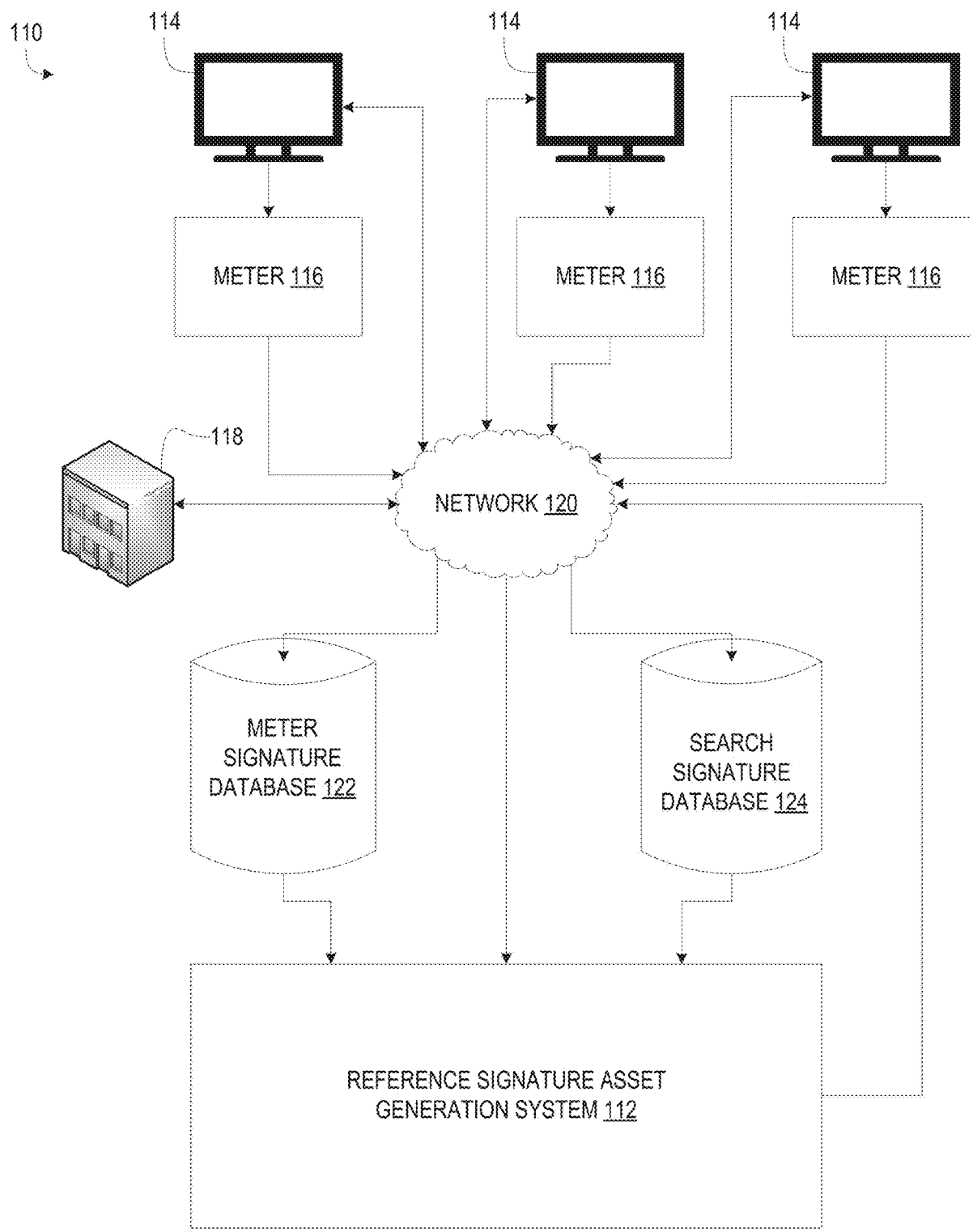
FIG. 1 is a block diagram of an example environment including a reference signature asset generation system to generate reference signature assets from meter signatures in accordance with teachings of this disclosure.

The figures are not to scale. In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Audience measurement companies desire to gain knowledge regarding how users interact with client devices (e.g., televisions, handheld mobile devices, smartphones, laptop computers, tablets, etc.). For example, monitoring companies want to monitor media (e.g., television programs, music, Internet videos, etc.) that is presented on the client devices to, among other things, monitor exposure to advertisements, determine advertisement effectiveness, determine user behavior, identify purchasing behavior associated with various demographics, credit media consumption rates, etc. Some audience measurement systems utilize meters coupled to client devices to generate digital signatures of the media that is presented on the client device. In some examples, the generated signatures are associated with respective timestamps of when the signatures were generated. The meter-generated signatures are then compared to a database of reference signatures to identify and, thus, monitor media being presented (e.g., visibly and/or audibly) by the client device.

Signature-based media monitoring techniques (also referred to as fingerprint-based monitoring techniques) generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A signature may be a sequence/string of signatures collected over a time interval. A good signature is repeatable when processing the same media presentation, but is unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media sources. Various comparison criteria, such as a cross-correlation value, a Hamming distance, etc., can be evaluated to determine whether a monitored signature matches a particular reference signature. As such, a match can be found based on one or more comparison criteria even when two compared signatures (or two compared signature sequences/strings) are not identical. When a match between the monitored signature and one of the reference signatures is found, the monitored media can be identified as corresponding to the particular reference media represented by the reference signature that matched the monitored signature. Because attributes, such as an identifier of the media, a presentation time, a broadcast channel, etc., are collected for the reference signature, these attributes may then be associated with the monitored media whose monitored signature matched the reference signature. Example systems for identifying media based on codes and/or signatures are long known and were first disclosed in Thomas, U.S. Pat. No. 5,481,294, which is hereby incorporated by reference in its entirety.

As used herein, a reference signature asset refers to a sequence/string of signatures generated from a piece of media to represent at least some portion of the media. For example, a complete reference signature asset can be a sequence/string of signatures sufficient to represent a piece of media in its entirety (e.g., from the start to the end of the piece of media). In some examples, a piece of media may not yet be represented by a complete reference signature asset in a reference database. For example, an audience measurement entity (AME) may not have a complete reference signature asset for a newly released song, a rare and/or old recording, a regional broadcast, user generated media, etc. However, in some such examples, the AME may have access to a search signature database, which includes signatures of portions of the piece of media, which are referred to herein as search signatures. In some examples, the search signatures are organized into sequences/strings of search signatures which correspond to part of a known, reference piece of media. In some such examples, the search signature sequences/strings have known start and end times within the reference piece of media, and represent a known length/portion of the reference piece of media.

Example systems, methods, and apparatus disclosed herein collect, analyze, collate, and associate meter-generated signatures representative of media to form complete reference signature assets for that media. In some examples, meter-generated signatures (also referred to as meter signatures) of the media presented on client devices are compared against the database of search signatures that partially represent corresponding pieces of reference media. For example, each search signature sequence/string included in the database may represent a respective portion (e.g., duration) of a corresponding piece of reference media. In some such examples, when a match is found between a search signature sequence/string and a meter-generated signature sequence/string, the meter-generated signature sequence/string is added to a pool of candidate signature assets corresponding to the reference media represented by the search signature sequence/string that matched the meter-generated signature sequence/string. In some examples, the candidate signature assets in the pool of candidate signature assets are compared against each other, and the number of matching candidate signature assets are counted. In some such examples, if the number of matching candidate signature assets satisfies (e.g., meets or exceeds) a threshold, a reference signature asset is selected from among the set of matching candidate signature assets to represent the reference media.

FIG. 1 is a block diagram of an example environment 110 in which an example reference signature asset generation system 112 constructed in accordance with teachings of this disclosure operates to generate reference signature assets from meter signatures. The reference signature assets are generated to be representative of reference media for which sequences/strings of search signatures are available in an example search signature database 124. A search signature sequence, also referred to as a search signature string, is a set of temporally related (e.g., sequential) search signatures that correspond to a fragment of a complete reference signature asset that can be used to match against meter signatures to potentially identify the media corresponding to the meter signatures. The search signature sequence is accompanied by metadata that describes the position of the search signature sequence within the reference media or, in other words, the portion of the reference media represented by the search signature sequence. In some examples, the metadata includes the start time of the search signature sequence within the reference media, the end time of the search signature sequence within the reference media, and the length (e.g., overall duration) of the reference media. In some examples, the end time of the search signature sequence within the reference media is omitted in favor of a length (e.g., duration) of the portion (e.g., fragment) of the piece of reference media represented by the search signature sequence.

The example environment 110 includes the example reference signature asset generation system 112, one or more example client devices 114, one or more example meters 116, an example central facility 118, an example network 120, an example meter signature database 122, and an example search signature database 124. In the illustrated example of FIG. 1, the client devices 114 can correspond to any media device, such as televisions, smartphones, radios, computers, laptops, music players, disc readers, streaming media receivers, etc. Although the example environment 110 is illustrated as including multiple client devices 114 and meters 116, in some examples the environment 110 may include one client device 114 and one meter 116.

According to the illustrated example, the reference signature asset generation system 112, the client devices 114, the meters 116, the central facility 118, the meter signature database 122, and the search signature database 124 are interconnected via the example network 120. Each example client device 114 is transmissibly coupled to one example meter 116 (e.g., wired, over Wi-Fi, over Bluetooth®, etc.). The example client device 114 receives network distributed media via the network 120. In some examples, the reference signature asset generation system 112 is located at the central facility 118. However, in some examples, the reference signature asset generation system 112 is located at a remote location from the central facility 118.

The example meters 116 generate signatures, referred to herein as meter signatures, representative of the media presented on the client devices 114. Based on the sampling rate of the example meter 116 and the length of time for which the media was presented and monitored by the meter 116, the signatures are generated as sequences/strings of individual signatures. For example, where the meter 116 has a sampling rate of three signatures per second and a piece of media is presented for one minute, a string of 180 individual signatures representative of the piece of media are generated by the meter 116. Further, the example meters 116 generate the same, or similar, signature strings for the same piece of presented media. For example, a first meter coupled to a first client device presenting a movie in Montana at 11:00 AM on a Saturday may generate the same (or similar, e.g., depending on background noise, client device characteristics, etc.) signature string as a second meter coupled to a second client device presenting the same movie in Illinois at 8:00 PM on a Wednesday. Signature strings are discussed in further detail below in conjunction with FIG. 4. The example meter 116 relays the signature strings to the example reference signature asset generation system 112 via the example network 120 and the example meter signature database 122. The terms "signature string", "signature sequence", and "sequence of signatures" is hereby used interchangeably within.

In operation, when media is presented to users by the example client devices 114, the example meters 116 generate meter signature sequences/strings representative of the media and report (e.g., transmit) the meter signature strings to the example meter signature database 122. The example reference signature asset generation system 112 receives the meter signature strings from the example meter signature database 122 and attempts to match segments of the meter signature strings to search signature sequence(s) stored in the example search signature database 124. Using the results of these matches, the reference signature asset generation system 112 generates candidate signature assets for a given piece of reference media from the meter signature sequences/strings determined to match the search signature sequence(s)/string(s) corresponding to that reference media, identifies a reference signature asset from the collection from the collection of candidate signature assets for that reference media if the reference signature asset generation system 112 determines that there is sufficient agreement among the collection of candidate signature assets, and outputs the resulting reference signature asset to the central facility 118.

The example reference signature asset generation system 112 queries the example meter signature database 122 to determine which meter signature sequence/string to send to the example reference signature asset generation system 112. The reference signature asset generation system 112 can employ any ordering technique to select meter signature strings, but in some examples, the reference signature asset generation system 112 is configured to select the meter signature strings based on a priority of the meter signature sequences/strings. This priority can be determined through a number of factors, including, but not limited to, the time a meter signature sequence/string was generated, the source that generated a meter signature sequence/string, any associated metadata, and example client device 114, etc.

The example reference signature asset generation system 112 queries the example search signature database 124 to determine which search signature sequence/string to send to the example reference signature asset generation system 112. The reference signature asset generation system 112 can employ any ordering technique to select search signature sequences/strings, but in some examples, the reference signature asset generation system 112 is configured to select the search signature sequences/strings optimally for faster matching. In one example, certain search signature sequences/strings are prioritized at certain times in the day. In another example, some search signature sequences/strings are prioritized when it is known that a certain event draws a lot of viewers (e.g., Super Bowl, the Oscars, etc.). In some examples, if it is determined that a search signature sequence/string will not be able to find a reference signature asset at any point in the process, it may not be selected for optimization of the system.

Figure 2:
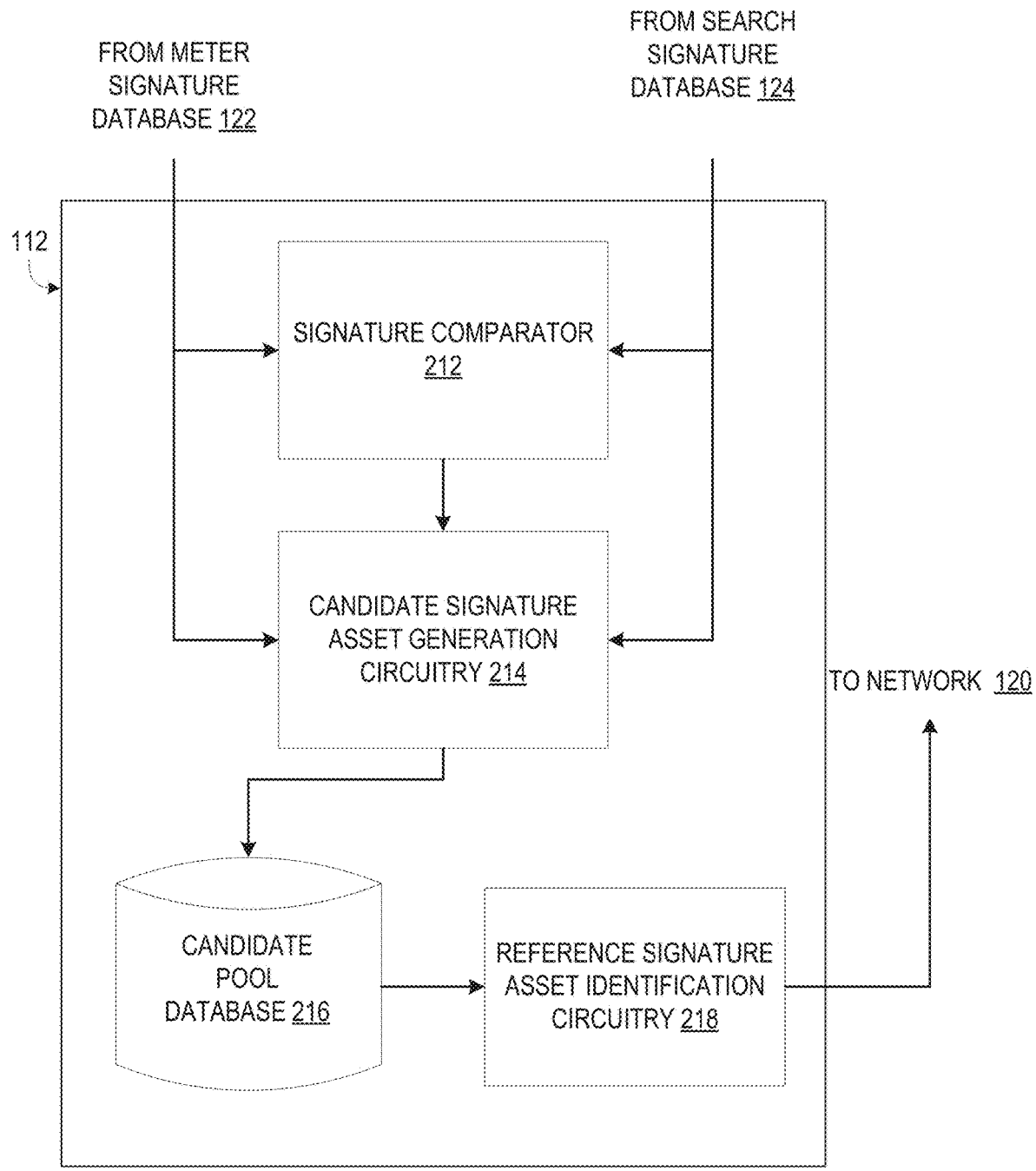
FIG. 2 is a block diagram of an example implementation of the reference signature asset generation system of FIG. 1.

FIG. 2 is a block diagram of an example implementation of the example reference signature asset generation system 112 of FIG. 1. The example implementation includes an example signature comparator 212, example candidate signature asset generation circuitry 214, an example candidate pool database 216, and example reference signature asset identification circuitry 218.

In the illustrated example, the signature comparator 212 compares meter signature sequences/strings from the example meter signature database 122 with search signature sequences/strings from the example search signature database 124. When the example signature comparator 212 finds a match between a search signature sequence/string and a meter signature sequence/string, the example signature comparator 212 instructs the example candidate signature asset generation circuitry 214 to begin operation.

The example candidate signature asset generation circuitry 214 receives the matched meter signature sequence/string from the example meter signature database 122 and the metadata associated with the sequence position of the matched search signature sequence/string from the example search signature database 124. Using the sequence position, the example candidate signature asset generation circuitry 214 extracts a candidate signature asset from the meter signature string and stores it in a corresponding candidate pool for the matched piece of reference media maintained in the example candidate pool database 216.

In some examples, the extraction is done by identifying a potential media window. In some examples, the candidate signature asset generation circuitry 214 determines this media window by calculating a potential start time and potential end time of the matched meter signature sequence/string that could completely represent the matched piece of reference media. The potential start time is calculated by taking the start time of the search signature sequence/string in the matched reference media (e.g., where the search signature start time is obtained from the metadata associated with the matched search signature sequence/string), and subtracting that search signature start time from the beginning time of the matched portion in the meter signature. The potential end time is calculated by taking the difference between the end time of the search signature sequence/string in the matched reference media and the length of the matched reference media (e.g., where the search signature end time and the length of the matched reference media are obtained from the metadata associated with the matched search signature sequence/string), and adding this difference to the end of the matched portion in the meter signature. In some examples, the potential media window is slightly extended beyond the expected content length to account for pauses and interruptions by the example client device 114. In some examples, the calculated beginning of the potential media window is before the start of the meter signature, in which case the example candidate signature asset generation circuitry 214 can choose to discard the meter signature or change the beginning of the media window to be the start of the meter signature. In some examples, analogous to the previous scenario, the calculated end of the potential media window is after the end of the meter signature. In this case, the example candidate signature asset generation circuitry 214 can choose to discard the meter signature or change the end of the potential media window to be the end of the meter signature.

Operation of the example signature comparator 212 and the example candidate signature asset generation circuitry 214 is explained in further detail below in conjunction with FIG. 4.

In some examples, the example candidate pool database 216 stores candidate pools for each piece of reference media having one or more search signature sequences/strings stored in the example search signature database 124. A candidate pool for a piece of reference media refers to a set of candidate signature assets that were generated from meter signatures sequences/strings that matched the one or more search signature sequences/strings corresponding to that piece of reference media. In some examples, there are fewer candidate pools than search signature sequences/strings if there are multiple search signature sequences/strings that represent the same reference media (e.g., that represent different fragments of the same reference media). In some such examples, the candidate pool database 216 implements a surjective function that takes a search signature sequence as an input and returns its candidate pool as an output.

The example reference signature asset identification circuitry 218 accesses the example candidate pool database 216 to compare candidate signature assets in a candidate pool associated with a particular piece of reference media. If there are enough matches within a candidate pool (e.g., if the number of matching candidate signature assets in the candidate pool satisfies (e.g., meets or exceeds) a threshold), the reference signature asset identification circuitry 218 selects one of the matching candidate signature assets from that candidate pool to be a reference signature asset to represent that piece of reference media. In some examples, the reference signature asset identification circuitry 218 sends the resulting reference signature asset to the example central facility 118. In some examples, the reference signature asset identification circuitry 218 selects a new representative reference signature asset when a candidate pool that has already selected a representative reference signature asset is updated. Operation of the example reference signature asset identification circuitry 218 is to be explained in further detail below in conjunction with FIG. 3.

Figure 3:
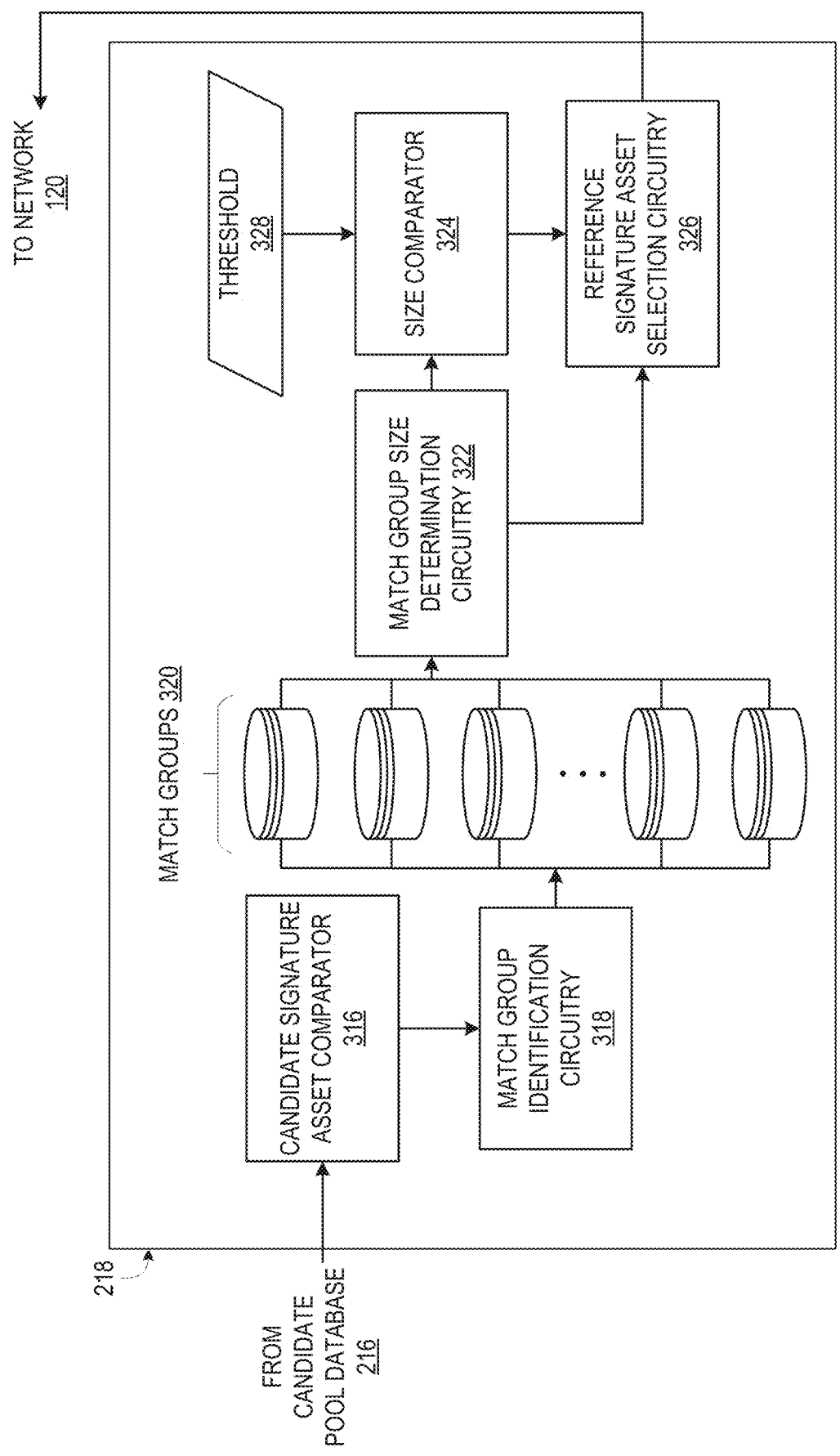
FIG. 3 is a block diagram of an example implementation of reference signature asset identification circuitry included in the example reference signature asset generation system of FIG. 2.

FIG. 3 is a block diagram of an example implementation of the example reference signature asset identification circuitry 218 of FIG. 2. The example reference signature asset identification circuitry 218 includes an example candidate signature asset comparator 316, example match group identification circuitry 318 to identify example match groups 320, example match group size determination circuitry 322, an example size comparator 324 to compare match group sizes to an example threshold 328, and example reference signature asset selection circuitry 326.

The example candidate signature asset comparator 316 compares candidate signature assets from a candidate pool in the example candidate pool database 216. The candidate pool corresponds to a particular piece of reference media (e.g., an episode of a television program, a movie, a song, a social media video, a news broadcast, a sports broadcast, a broadcast of a special event, a podcast, an audiobook, a video/audio advertisement, etc). In some examples, there are multiple candidate pools corresponding respectively to multiple, different pieces (also referred to as instances) of reference media. In the illustrated example, the candidate signature asset comparator 316 restricts comparison of candidate signature assets to be from the same candidate pool. As described above, a given candidate pool contains candidate signature assets formed from meter signatures having portions that matched the search signature sequence(s)/string(s) of the reference media corresponding to that candidate pool. As noted above, the candidate signature assets correspond to segments of those matched meter signatures that have been trimmed to the expected length of the piece of reference media. In some examples, the candidate signature asset comparator 316 operates to compare every possible pair of candidate signature assets in the candidate pool. In some examples, one or more possible pairs of candidate signature assets in the candidate pool is/are skipped when the candidate signature asset comparator 316 determines that a match would not contribute to a match group (which is described in further detail below) that has the potential to satisfy the example threshold 328 (e.g., a candidate signature asset has no matches so far, there are three remaining candidate signature assets to match against, and the threshold is five).

The example match group identification circuitry 318 organizes the candidate signatures into example match groups 320, based on the results of the matching from the example candidate signature asset comparator 316. In some examples, the match group identification circuitry 318 implements one or more Union-Find algorithms to develop the match group(s) for each candidate pool. In the illustrated example of FIG. 4, there are multiple match groups 320 shown for a given candidate pool, but in some examples, there may be no match groups or just one match group for a given candidate pool.

After the candidate signature assets for a given candidate pool associated with a given reference media instance have been added to the example match groups 320, the example match group size determination circuitry 322 finds the largest match group among the example match groups 320 and calculates the size of the largest match group.

The example size comparator 324 compares the size of the largest match group to the example threshold 328. In some examples, the size of the example threshold 328 is changed during operation of the example reference signature asset identification circuitry 218, for example, based on the size of the candidate pool the example reference signature asset identification circuitry 218 is attempting to find a reference signature asset for.

If the size of the largest match group satisfies (e.g., meets or exceeds) the example threshold 328, the reference signature asset selection circuitry 326 chooses a candidate signature asset from the largest match group as a reference signature asset to be representative of the entire candidate pool and, thus, to be representative of the piece of reference media associated with that pool. This reference signature asset is sent to the central facility 118 via the network 120. If the size of the largest match group for a candidate pool does not satisfy the example threshold 428, then the example reference signature asset selection circuitry 326 does not select a reference signature asset for that candidate pool. In some examples, the example reference signature asset selection circuitry 326 can modify the selected reference signature asset when the selected reference signature asset has one or more portions that do not match the other candidate signature assets in the selected representative candidate pool. In some examples, the example reference signature asset selection circuitry 326 chooses a reference signature asset from the largest match group for a candidate pool if the difference between the size of the largest match group for the candidate pool and the size of the next largest match group for the candidate pool satisfies (e.g., is equal to or exceeds) the example threshold 328. In some examples, the reference signature asset identification circuitry 218 modifies the selected reference signature asset when the selected reference signature asset contains sections that do not match the other candidate signature assets in the match group the reference signature asset was selected from (e.g., different commercials but same reference media, the media presentation was paused and restarted, etc.), despite enough matching to be placed in the same match group. In some such examples, the sections are modified by being deleted. In other such examples, the sections are modified by changing their signatures to a value that indicates that the signatures may not be representative of the reference media.

Figure 4:
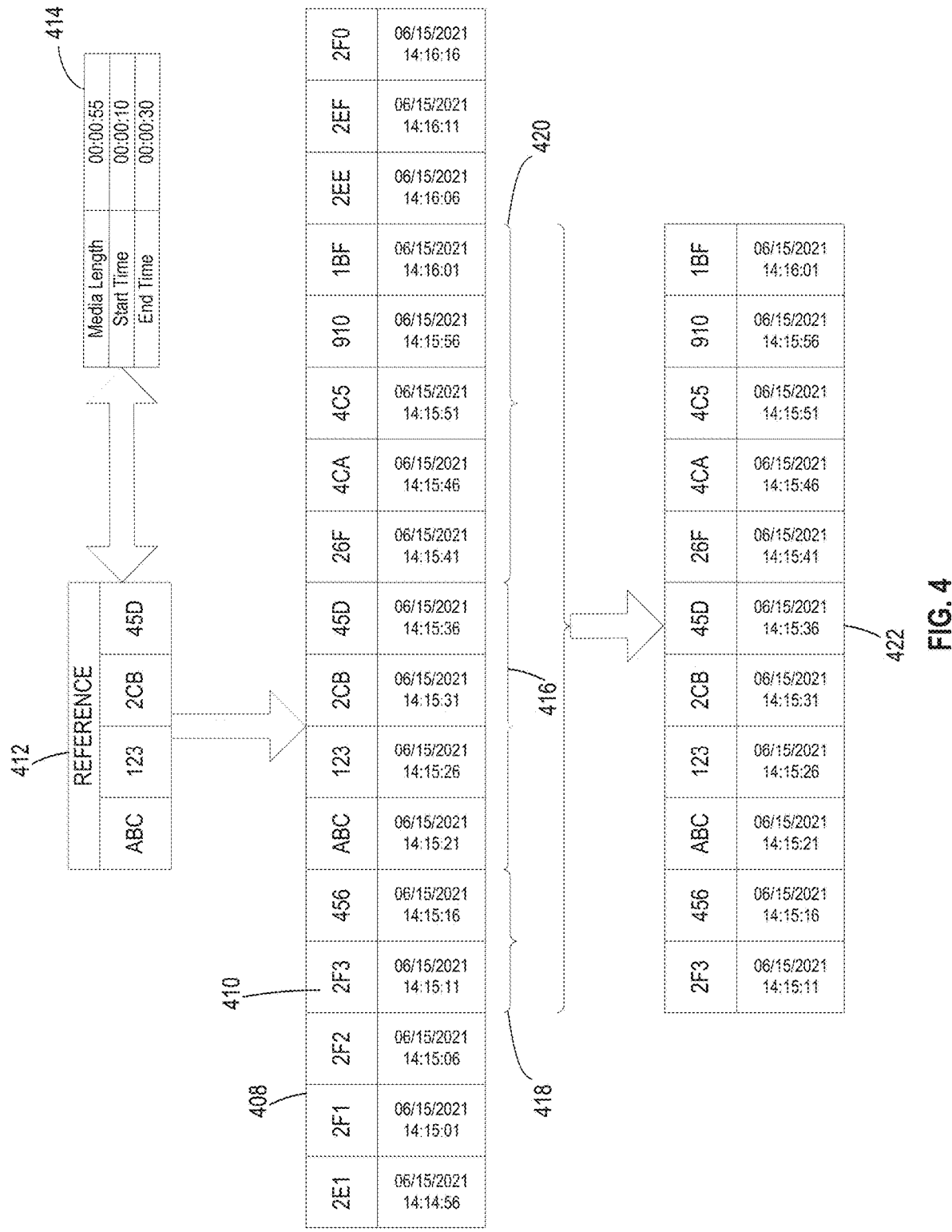
FIG. 4 illustrates an example candidate signature that is extracted from an example meter signature by example candidate signature asset generation circuitry included in the reference signature asset generation system of FIG. 2.

FIG. 4 illustrates an example meter signature that is segmented into an example candidate signature by the example candidate signature asset generation circuitry 214. In the illustrated example of FIG. 4, an example portion (e.g., the example match fragment 416) of an example meter signature string 408 is determined by the example signature comparator 212 to match an example search signature sequence 412 representative of a fragment of a piece of reference media. The example meter signature sequence/string 408 includes a series of example individual meter signatures 410. The example individual meter signatures 410 each include a value (e.g., a hexadecimal number, a binary number, an integer, an identifier, a letter, etc.) generated by a characteristic(s) of the monitored media, as well as a signature timestamp associated with that value (e.g., to indicate when that signature value was generated). For example, the example individual meter signature 410 illustrated in FIG. 4 has a value "2F3" that is associated with signature timestamp "6/15/2021 14:15:11" (e.g., the example meter 116 of FIG. 1 generated value "2F3" at 2:15:11 PM on Jun. 15, 2021).

In the illustrated example of FIG. 4, an example search signature sequence/string 412 matches the fragment 416 of the example meter signature sequence/string 408. The example search signature sequence/string 412 has accompanying example sequence position data 414 (e.g., stored as metadata associated with the search signature sequence/string 412). The example sequence position data 414 includes, but is not limited to, data specifying the overall length of the given reference media represented by the search signature sequence/string 412, as well as the positional start and end times of the search signature sequence/string 412 within that given piece of reference media. However, in some examples, the sequence position data can include different data, such as a search signature sequence length in lieu of the search signature start time or end time. The example sequence position data 414 is acquired by the example candidate signature asset generation circuitry 214 from the example search signature database 124.

The section of the meter signature sequence/string 408 that matches the example search signature sequence 412 is referred to as an example match fragment 416. Since the associated start time of the example search signature sequence/string 412 is 10 seconds, the candidate signature asset generation circuitry 214 identifies the 10 second segment of the meter signature sequence/string before the match fragment 416 as an example pre-match fragment 418. In other words, the amount of time to mark before the example match fragment 416 is calculated to have a duration corresponding to the start time of the example search signature sequence 412. Also, because the associated end time of the example search signature sequence 412 is at 30 seconds, and the overall length of the reference media represented by the search signature sequence 412 is 55 seconds as noted in the example sequence position data 414, the 25 second segment (corresponding to 55−30=25 seconds) of the meter signature sequence/string after the example match fragment 416 is marked as an example post-match fragment 420. In other words, the amount of time to mark after the example match fragment 416 is calculated as the overall length of the reference media minus the end time of the example search signature sequence 412. The example pre-match fragment 418, the example match fragment 416, and the example post-match fragment 420 together form an example candidate signature asset 422 to be included in the candidate pool for the piece of reference media represented by the search signature sequence/string 412.

In some examples, the example reference signature asset generation system 112 includes means for comparing signature sequences/strings. For example, the means for comparing may be implemented by a signature comparator 212. In some examples, the signature comparator 212 may be implemented by machine executable instructions such as that implemented by at least block 520 of FIG. 5 executed by processor circuitry, which may be implemented by the example processor circuitry 812 of FIG. 8, the example processor circuitry 900 of FIG. 9, and/or the example Field Programmable Gate Array (FPGA) circuitry 1000 of FIG. 10. In other examples, the signature comparator 212 is implemented by other hardware logic circuitry, hardware implemented state machines, and/or any other combination of hardware, software, and/or firmware. For example, the signature comparator 212 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the example reference signature asset generation system 112 includes means for generating candidate signature assets. For example, the means for generating may be implemented by candidate signature asset generation circuitry 214. In some examples, the candidate signature asset generation circuitry 214 may be implemented by machine executable instructions such as that implemented by at least block 525 of FIG. 5 and blocks 605, 610, and 615 of FIG. 6 executed by processor circuitry, which may be implemented by the example processor circuitry 812 of FIG. 8, the example processor circuitry 900 of FIG. 9, and/or the example Field Programmable Gate Array (FPGA) circuitry 1000 of FIG. 10. In other examples, the candidate signature asset generation circuitry 214 is implemented by other hardware logic circuitry, hardware implemented state machines, and/or any other combination of hardware, software, and/or firmware. For example, the candidate signature asset generation circuitry 214 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the example reference signature asset generation system 112 includes means for storing candidate signature assets. For example, the means for storing may be implemented by a candidate pool database 216. In some examples, the candidate pool database 216 may be implemented by machine executable instructions such as that implemented by at least block 530 of FIG. 5 executed by processor circuitry, which may be implemented by the example processor circuitry 812 of FIG. 8, the example processor circuitry 900 of FIG. 9, and/or the example Field Programmable Gate Array (FPGA) circuitry 1000 of FIG. 10. In other examples, the candidate pool database 216 is implemented by other hardware logic circuitry, hardware implemented state machines, and/or any other combination of hardware, software, and/or firmware. For example, the candidate pool database 216 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the example reference signature asset generation system 112 includes means for identifying reference signature assets. For example, the means for identifying may be implemented by reference signature asset identification circuitry 218. In some examples, the reference signature asset identification circuitry 218 may be implemented by machine executable instructions such as that implemented by at least block 540 of FIG. 5 and blocks 710, 715, 720, 725, 730, 735, and 740 of FIG. 7 executed by processor circuitry, which may be implemented by the example processor circuitry 812 of FIG. 8, the example processor circuitry 900 of FIG. 9, and/or the example Field Programmable Gate Array (FPGA) circuitry 1000 of FIG. 10. In other examples, the reference signature asset identification circuitry 218 is implemented by other hardware logic circuitry, hardware implemented state machines, and/or any other combination of hardware, software, and/or firmware. For example, the reference signature asset identification circuitry 218 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the example reference signature asset generation system 112 includes means for comparing candidate signature assets. For example, the means for comparing may be implemented by candidate signature asset comparator 316. In some examples, the candidate signature asset comparator 316 may be implemented by machine executable instructions such as that implemented by at least block 540 of FIG. 5 and block 715 of FIG. 7 executed by processor circuitry, which may be implemented by the example processor circuitry 812 of FIG. 8, the example processor circuitry 900 of FIG. 9, and/or the example Field Programmable Gate Array (FPGA) circuitry 1000 of FIG. 10. In other examples, the candidate signature asset comparator 316 is implemented by other hardware logic circuitry, hardware implemented state machines, and/or any other combination of hardware, software, and/or firmware. For example, the candidate signature asset comparator 316 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the example reference signature asset generation system 112 includes means for identifying match groups. For example, the means for identifying may be implemented by match group identification circuitry 318. In some examples, the match group identification circuitry 318 may be implemented by machine executable instructions such as that implemented by at least block 720 of FIG. 7 executed by processor circuitry, which may be implemented by the example processor circuitry 812 of FIG. 8, the example processor circuitry 900 of FIG. 9, and/or the example Field Programmable Gate Array (FPGA) circuitry 1000 of FIG. 10. In other examples, the match group identification circuitry 318 is implemented by other hardware logic circuitry, hardware implemented state machines, and/or any other combination of hardware, software, and/or firmware. For example, the match group identification circuitry 318 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.)

structured to perform the corresponding operation without executing software or firmware, but other structures are likewise appropriate.

In some examples, the example reference signature asset generation system 112 includes means for storing groups of compared candidate signature assets. For example, the means for storing may be implemented by match groups 320. In some examples, the match groups 320 may be implemented by machine executable instructions such as that implemented by at least block 540 of FIG. 5 and block 720 of FIG. 7 executed by processor circuitry, which may be implemented by the example processor circuitry 812 of FIG. 8, the example processor circuitry 900 of FIG. 9, and/or the example Field Programmable Gate Array (FPGA) circuitry 1000 of FIG. 10. In other examples, the match groups 320 are implemented by other hardware logic circuitry, hardware implemented state machines, and/or any other combination of hardware, software, and/or firmware. For example, the match groups 320 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the example reference signature asset generation system 112 includes means for determining the size of match groups. For example, the means for determining may be implemented by match group size determination circuitry 322. In some examples, the match group size determination circuitry 322 may be implemented by machine executable instructions such as that implemented by at least block 725 of FIG. 7 executed by processor circuitry, which may be implemented by the example processor circuitry 812 of FIG. 8, the example processor circuitry 900 of FIG. 9, and/or the example Field Programmable Gate Array (FPGA) circuitry 1000 of FIG. 10. In other examples, the match group size determination circuitry 322 is implemented by other hardware logic circuitry, hardware implemented state machines, and/or any other combination of hardware, software, and/or firmware. For example, the match group size determination circuitry 322 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the example reference signature asset generation system 112 includes means for comparing the size of match groups 320 against a threshold 328. For example, the means for comparing may be implemented by a size comparator 324. In some examples, the size comparator 324 may be implemented by machine executable instructions such as that implemented by at least block 730 of FIG. 7 executed by processor circuitry, which may be implemented by the example processor circuitry 812 of FIG. 8, the example processor circuitry 900 of FIG. 9, and/or the example Field Programmable Gate Array (FPGA) circuitry 1000 of FIG. 10. In other examples, the size comparator 324 is implemented by other hardware logic circuitry, hardware implemented state machines, and/or any other combination of hardware, software, and/or firmware. For example, the size comparator 324 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the example reference signature asset generation system 112 includes means for selecting a reference signature asset. For example, the means for selecting may be implemented by reference signature asset selection circuitry 326. In some examples, the reference signature asset selection circuitry 326 may be implemented by machine executable instructions such as that implemented by at least block 735 of FIG. 7 executed by processor circuitry, which may be implemented by the example processor circuitry 812 of FIG. 8, the example processor circuitry 900 of FIG. 9, and/or the example Field Programmable Gate Array (FPGA) circuitry 1000 of FIG. 10. In other examples, the reference signature asset selection circuitry 326 is implemented by other hardware logic circuitry, hardware implemented state machines, and/or any other combination of hardware, software, and/or firmware. For example, the reference signature asset selection circuitry 326 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

While an example manner of implementing the reference signature asset generation system 112 is illustrated in FIGS. 1-3, one or more of the elements, processes, and/or devices illustrated in FIGS. 1-3 may be combined, divided, rearranged, omitted, eliminated, and/or implemented in any other way. Further, the example signature comparator 212, the example candidate signature asset generation circuitry 214, the example candidate pool database 216, the example reference signature asset identification circuitry 218, the example candidate signature asset comparator 316, the example match group identification circuitry 318, the example match groups 320, the example match group size determination circuitry 322, the example size comparator 324, the example reference signature asset selection circuitry 326 and/or, more generally, the example reference signature asset generation system 112 of FIGS. 1-3, may be implemented by hardware, software, firmware, and/or any combination of hardware, software, and/or firmware. Thus, for example, any of the example signature comparator 212, the example candidate signature asset generation circuitry 214, the example candidate pool database 216, the example reference signature asset identification circuitry 218, the example candidate signature asset comparator 316, the example match group identification circuitry 318, the example match groups 320, the example match group size determination circuitry 322, the example size comparator 324, the example reference signature asset selection circuitry 326 and/or, more generally, the example reference signature asset generation system 112, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example reference signature asset generation system 112, the example signature comparator 212, the example candidate signature asset generation circuitry 214, the example candidate pool database 216, the example reference signature asset identification circuitry 218, the example candidate signature asset comparator 316, the example match group identification circuitry 318, the example match groups 320, the example match group size determination circuitry 322, the example size comparator 324, and/or the example reference signature asset selection circuitry 326 is/are hereby expressly defined to include a non-transitory computer readable storage device or storage disk such as a memory, a digital versatile disk (DVD), a compact disk (CD), a Blu-ray disk, etc., including the software and/or firmware. Further still, the example reference signature asset generation system 112 may include one or more elements, processes, and/or devices in addition to, or instead of, those illustrated in FIGS. 1, 2, and/or 3, and/or may include more than one of any or all of the illustrated elements, processes and devices.

Figure 5:
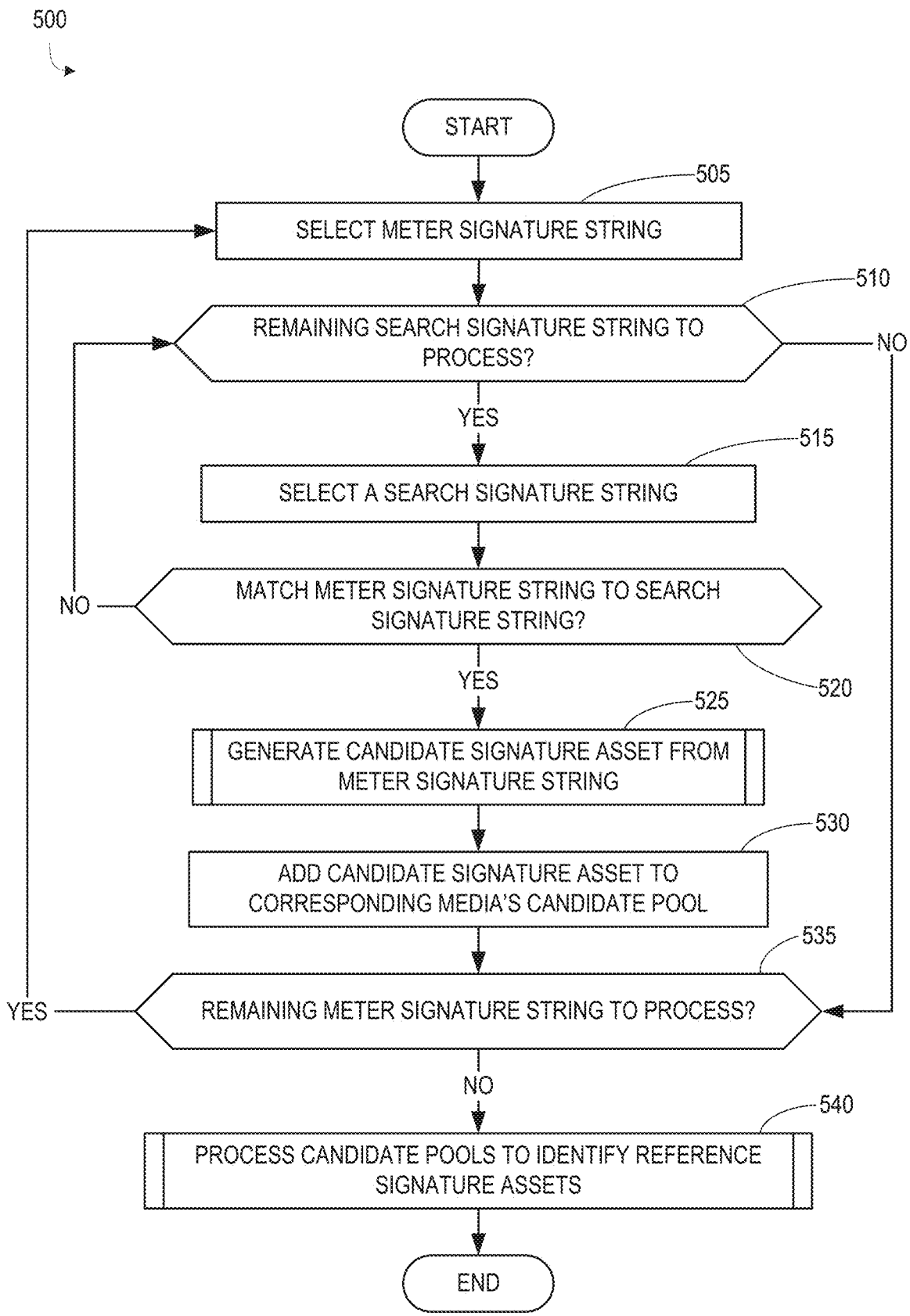
FIG. 5 is a flowchart representative of example machine-readable instructions that may be executed to implement the example reference signature asset generation system of FIG. 1.
Figure 6:
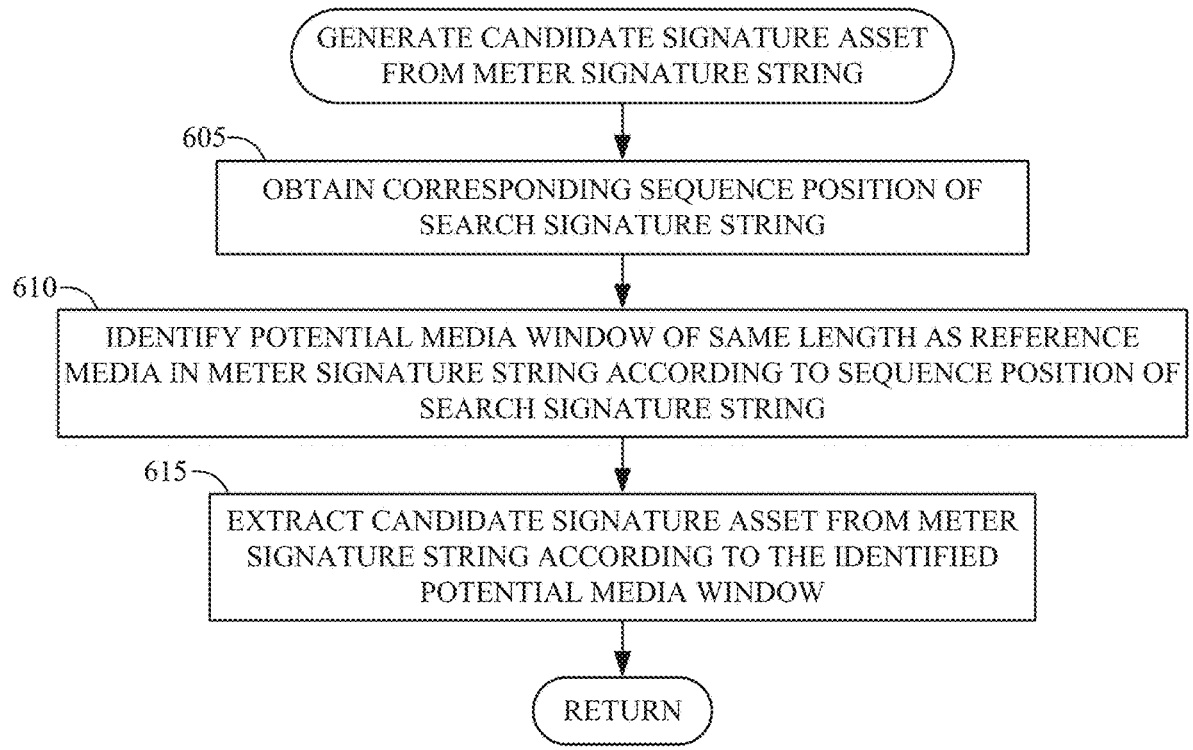
FIG. 6 is a flowchart representative of example machine-readable instructions that may be executed to implement the example candidate signature asset generation circuitry of FIG. 2.

Flowcharts representative of example hardware logic circuitry, machine readable instructions, hardware implemented state machines, and/or any combination thereof for implementing the reference signature asset generation system 112 of FIG. 1 are shown in FIGS. 5, 6, and/or 7. The machine readable instructions may be one or more executable programs or portion(s) of an executable program for execution by processor circuitry, such as the processor circuitry 812 shown in the example processor platform 800 discussed below in connection with FIG. 8 and/or the example processor circuitry discussed below in connection with FIGS. 9 and/or 10. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 5, 6, and/or 7, many other methods of implementing the example reference signature asset generation system 112 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 5, 6, and/or 7 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 5 is a flowchart representative of example machine-readable instructions 500 that may be executed to implement the example reference signature asset generation system 112. The example instructions 500 may be performed, for example, to match known search signature sequences/strings to meter signature sequence/strings, and to add the matched meter signature strings to the respective candidate pool of the known content media corresponding to the matched search signature sequence.

To start, the example meter signature database 122 selects a meter signature sequence/string to be matched (e.g., in response to a query from the example reference signature asset generation system 112). (Block 505). Next, the example search signature database 124 determines (e.g., in response to a query from the example reference signature asset generation system 112) whether there are remaining search signature sequences/strings left to process in the example search signature database 124. (Block 510). If the example search signature database 124 contains search signature sequences/strings that have not been compared to the selected meter signature sequence/string (e.g. block 510 returns a result of YES), then the example search signature database 124 selects a search signature sequence/string (e.g., in response to the query from the example reference signature asset generation system 112). (Block 515).

After both a meter signature sequence/string and search signature sequence/string have been selected, the example signature comparator 212 compares the meter signature sequence/string and the search signature sequence/string to check for a match. (Block 520). If there is a match between a portion of the meter signature sequence/string and the search signature sequence/string (e.g., Block 520 returns a result of YES), then the example candidate signature asset generation circuitry 214 processes the meter signature sequence/string to generate a candidate signature asset. (Block 525). If there is no match between the meter signature sequence/string and the search signature sequence/string (e.g., Block 520 returns a result of NO), then the instructions 500 return to block 510, and the search signature sequence/string is removed from the set of search signature sequences to be compared with the selected meter signature sequence/string undergoing processing. Note that this set of search signature sequences/strings is reset each time a new meter signature string is selected at block 505 for processing.

Returning to block 525, after the candidate signature asset is generated from the meter signature sequence/string, the example candidate signature asset generation circuitry 214 adds the candidate signature asset to a candidate pool in the example candidate pool database 216. (Block 530). The candidate pool the candidate signature asset is added to corresponds to the particular reference media represented by the search signature sequence that the meter signature string was determined to match at block 520. In some examples, several different search signature sequences can correspond to the same candidate pool, such as when the search signature sequences are representative of different fragments/portions of the same reference media.

After the candidate signature asset is added to the correct candidate pool, the example meter signature database 122 determines if there are any meter signature strings remaining to be processed. (Block 535). If there are still remaining meter signature strings to be matched (e.g., block 535 returns a result of YES), then the instructions 500 return to block 505. If there are no meter signature strings left to process (e.g., block 535 returns a result of NO), then the example reference signature asset identification circuitry 218 identifies a representative reference signature asset from each candidate pool in the example candidate pool database 216, if possible. (Block 540). In some examples, the identification of a representative reference signature asset from a candidate pool is repeated when that candidate pool is updated.

Referring back to block 520, if the example signature comparator 212 determines that the meter signature sequence/string does not match the search signature sequence/string (e.g., block 520 returns a result of NO), the instructions 500 return to block 510 to choose another search signature sequence.

Referring back to block 510, if the example search signature database 124 determines that there are no remaining search signature sequences (e.g., block 510 returns a result of NO), the instructions 500 skip ahead to block 535.

FIG. 6 is a flowchart representative of example machine-readable instructions that may be executed to implement block 525 of the example machine-readable instructions of FIG. 5.

The example candidate signature asset generation circuitry 214 gathers the example sequence position data 414, which includes the start time and end time of the signature fragment within the corresponding piece of reference media, as well as the overall length of the reference media, from the example search signature database 124 when the example signature comparator 212 finds a match between a search signature sequence/string and a meter signature sequence/string. (Block 605).

After the example sequence position 414 has been gathered, the example candidate signature asset generation circuitry 214 uses the sequence position 414 to identify a potential media window in the example meter signature sequence/string. (Block 610). The beginning of the potential media window is set as the start of the match portion of the meter signature sequence/string minus the start time of the example search signature sequence/string within the reference media. The end of the potential media window is set as the end of the match portion of the meter signature sequence/string plus the reference media length minus the end time of the example search signature sequence/string within the reference media. In some examples, this window can be slightly extended on one or both sides to account for user pauses of the media presentation, and/or other data inaccuracies.

After the potential media window has been identified, the example candidate signature asset generation circuitry 214 extracts the portion of the meter signature sequence/string corresponding to the potential media window to form a candidate signature asset intended to represent the reference media corresponding to the matched search signature sequence/series. (Block 615). This extraction can be done in a variety of methods, including but not limited to deleting the individual meter signatures of the meter signature sequence/string that are not within the potential media window, copying the individual meter signatures of the meter signature sequence/string that are within the potential media window to a data structure used to represent the candidate signature asset, etc.

Figure 7:
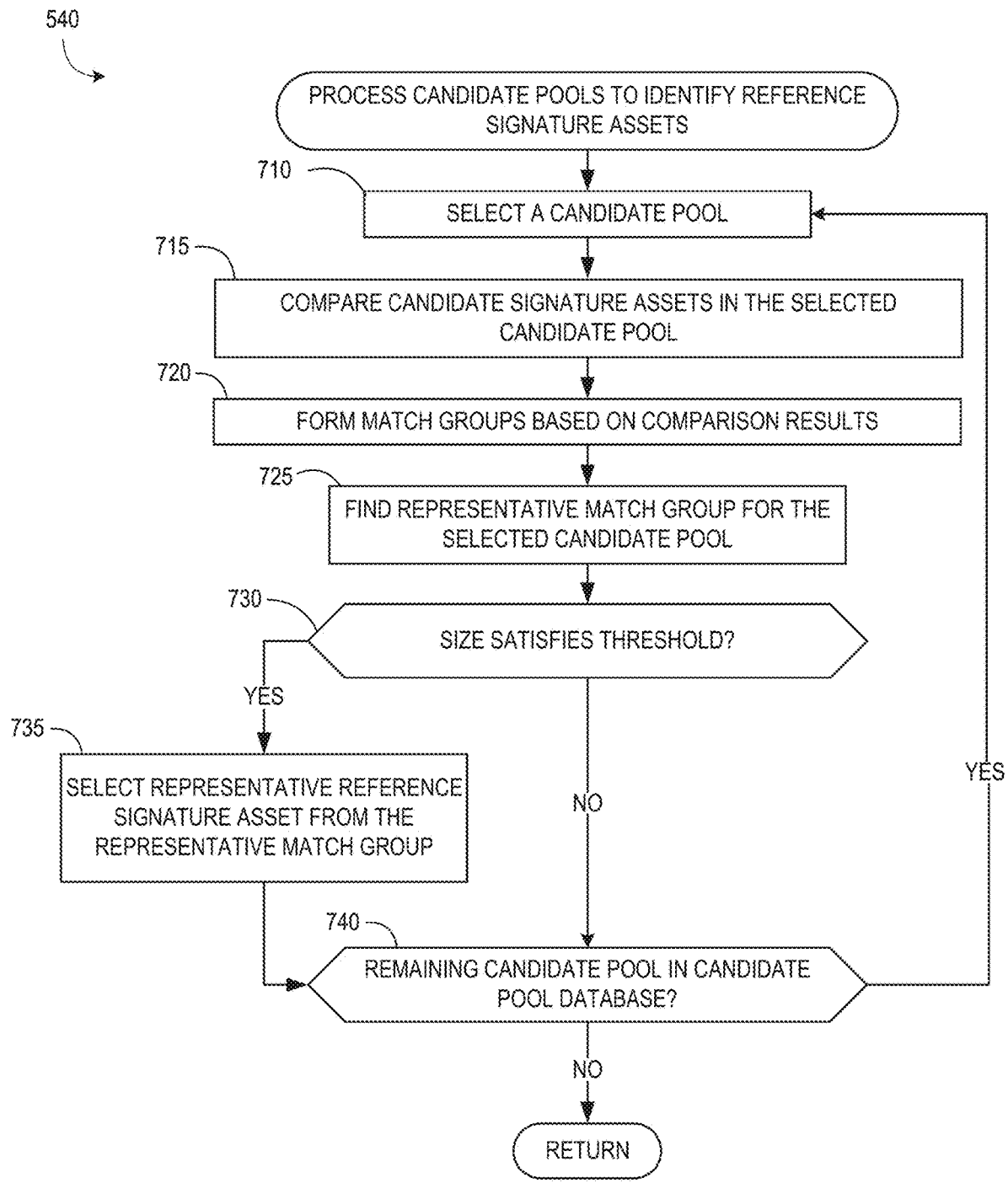
FIG. 7 is a flowchart representative of example machine-readable instructions that may be executed to implement the example reference signature asset identification circuitry of FIGS. 2 and/or 3.

FIG. 7 is a flowchart representative of example machine-readable instructions that may be executed to implement block 540 of the example machine-readable instructions of FIG. 5.

The example candidate pool database 216 selects a candidate pool to be processed to attempt to find a reference signature asset. (Block 710). The candidate pools are selected in any manner. In some examples, the order is determined based on a priority to find a reference signature asset for a particular piece of reference media.

The example candidate signature asset comparator 316 compares candidate signature assets from the candidate pool selected from the example candidate pool database 216. (Block 715). In some examples, one or more possible pairs of candidate signature assets in the candidate pool is/are skipped when the candidate signature asset comparator 316 determines that a match would not contribute to a match group (which is described in further detail below) that has the potential to satisfy the example threshold 328 (e.g. a candidate signature asset has no matches so far, there are three remaining candidate signature assets to match against, and the threshold is five).

Using the results from this matching, the example match group identification circuitry 318 segments the candidate signature assets of the selected candidate pool into example match groups 320 as matches are found among the candidate signature assets. (Block 720). In some examples, the grouping of example match groups 320 is implemented based on the principles of Union-Find algorithms. Candidate signature assets are only added to an example match group 320 when they match another candidate signature asset in the group, or a new match group may be created to include newly matched candidate signature assets that do not match the candidate signature assets in the existing match groups. If a candidate signature asset does not match any other candidate signature asset in the candidate pool, that unmatched candidate signature asset is not added to an example match group 320.

After the candidate signature assets have been arranged into example match groups 320, the example match group size determination circuitry 322 finds a representative match group for the selected candidate pool among the example match groups 320. (Block 725). In some examples, the match group size determination circuitry 322 selects the representative match group to be the largest match group, but other selection criteria can be additionally or alternatively used.

After the representative match group is determined, the example size comparator 324 determines if the size of the representative match group satisfies the example threshold 328. (Block 730). If the largest group does satisfy the example threshold 328 (e.g. block 730 returns a result of YES), the example reference signature asset selection circuitry 326 selects a candidate signature asset from the representative match group as the representative reference signature asset for the candidate signature pool. (Block 735). This candidate signature asset can be selected using a variety of factors, including but not limited to length of matching sections, quality of match against search signature sequence/string, time of candidate signature asset generation, etc. In some examples, the example reference signature asset selection circuitry 326 can modify the selected reference signature asset when the selected reference signature asset has portions that do not match the other candidate signature assets in the selected representative candidate pool. If the representative match group does not satisfy the example threshold 328 (e.g. block 730 returns a result of NO), the reference signature asset selection circuitry 326 does not select a candidate signature asset as a reference, and the candidate signature pool is unable to select a representative reference signature asset.

After a reference signature asset is selected or it is determined that one cannot be selected, the example candidate pool database 216 determines if there are any remaining candidate pools to be processed. (Block 740). If there are remaining candidate pools (e.g. block 740 returns a result of YES), the instructions to implement block 540 return to block 710 to select another candidate pool to find a reference signature asset for. If there are no remaining candidate pools (e.g. block 740 returns a result of NO), then the example reference signature asset identification circuitry 218 ceases operation.

Figure 8:
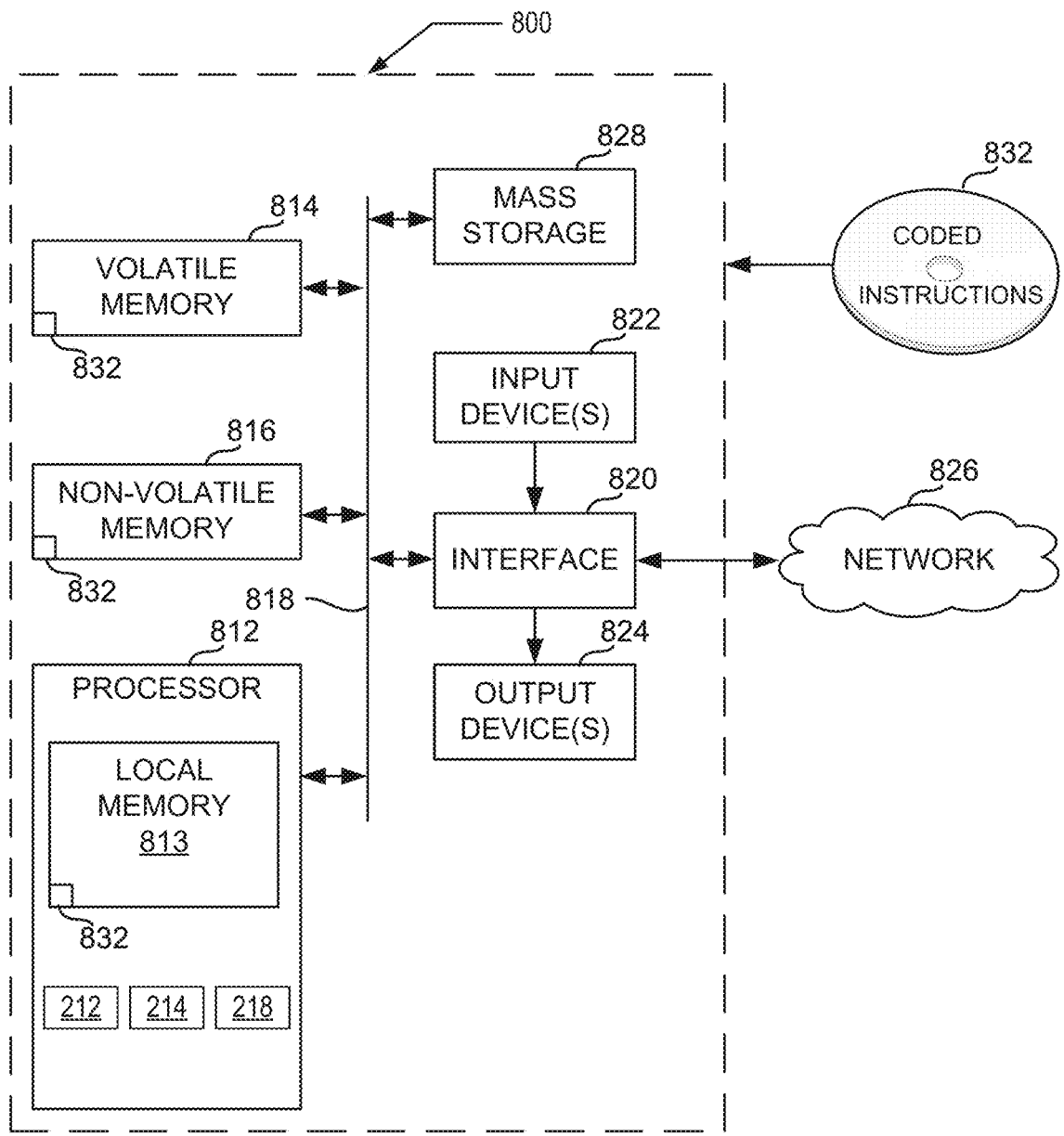
FIG. 8 is a block diagram of an example processing platform including processor circuitry structured to execute the example machine readable instructions of FIGS. 5, 6 and/or 7 to implement the example reference signature asset generation system of FIG. 1.

FIG. 8 is a block diagram of an example processor platform 800 structured to execute and/or instantiate the machine readable instructions and/or operations of FIGS. 5, 6, and/or 7 to implement the example reference signature asset generation system 112 of FIG. 2. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 800 of the illustrated example includes processor circuitry 812. The processor circuitry 812 of the illustrated example is hardware. For example, the processor circuitry 812 can be implemented by one or more integrated circuits, logic circuits, FPGAs microprocessors, CPUs, GPUs, DSPs, and/or microcontrollers from any desired family or manufacturer. The processor circuitry 812 may be implemented by one or more semiconductor based (e.g., silicon based) devices. In this example, the processor circuitry 812 implements a signature comparator 212, candidate signature asset generation circuitry 214, and reference signature asset identification circuitry 218.

The processor circuitry 812 of the illustrated example includes a local memory 813 (e.g., a cache, registers, etc.). The processor circuitry 812 of the illustrated example is in communication with a main memory including a volatile memory 814 and a non-volatile memory 816 by a bus 818. The volatile memory 814 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 816 may be implemented by flash memory and/or any other desired type of memory device. Access to the main memory 814, 816 of the illustrated example is controlled by a memory controller 817. In this example, the volatile memory 814 implements a candidate pool database 216.

The processor platform 800 of the illustrated example also includes interface circuitry 820. The interface circuitry 820 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 822 are connected to the interface circuitry 820. The input device(s) 822 permit(s) a user to enter data and/or commands into the processor circuitry 812. The input device(s) 822 can be implemented by, for example, an audio sensor, a microphone, a camera (still or video), a keyboard, a button, a mouse, a touchscreen, a track-pad, a trackball, an isopoint device, and/or a voice recognition system.

One or more output devices 824 are also connected to the interface circuitry 820 of the illustrated example. The output devices 824 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 820 of the illustrated example, thus, typically includes a graphics driver card, a graphics driver chip, and/or graphics processor circuitry such as a GPU.

The interface circuitry 820 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 826. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 800 of the illustrated example also includes one or more mass storage devices 828 to store software and/or data. Examples of such mass storage devices 828 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 832, which may be implemented by the machine readable instructions of FIGS. 5, 6, and/or 7, may be stored in the mass storage device 828, in the volatile memory 814, in the non-volatile memory 816, and/or on a removable non-transitory computer readable storage medium such as a CD or DVD.

Figure 9:
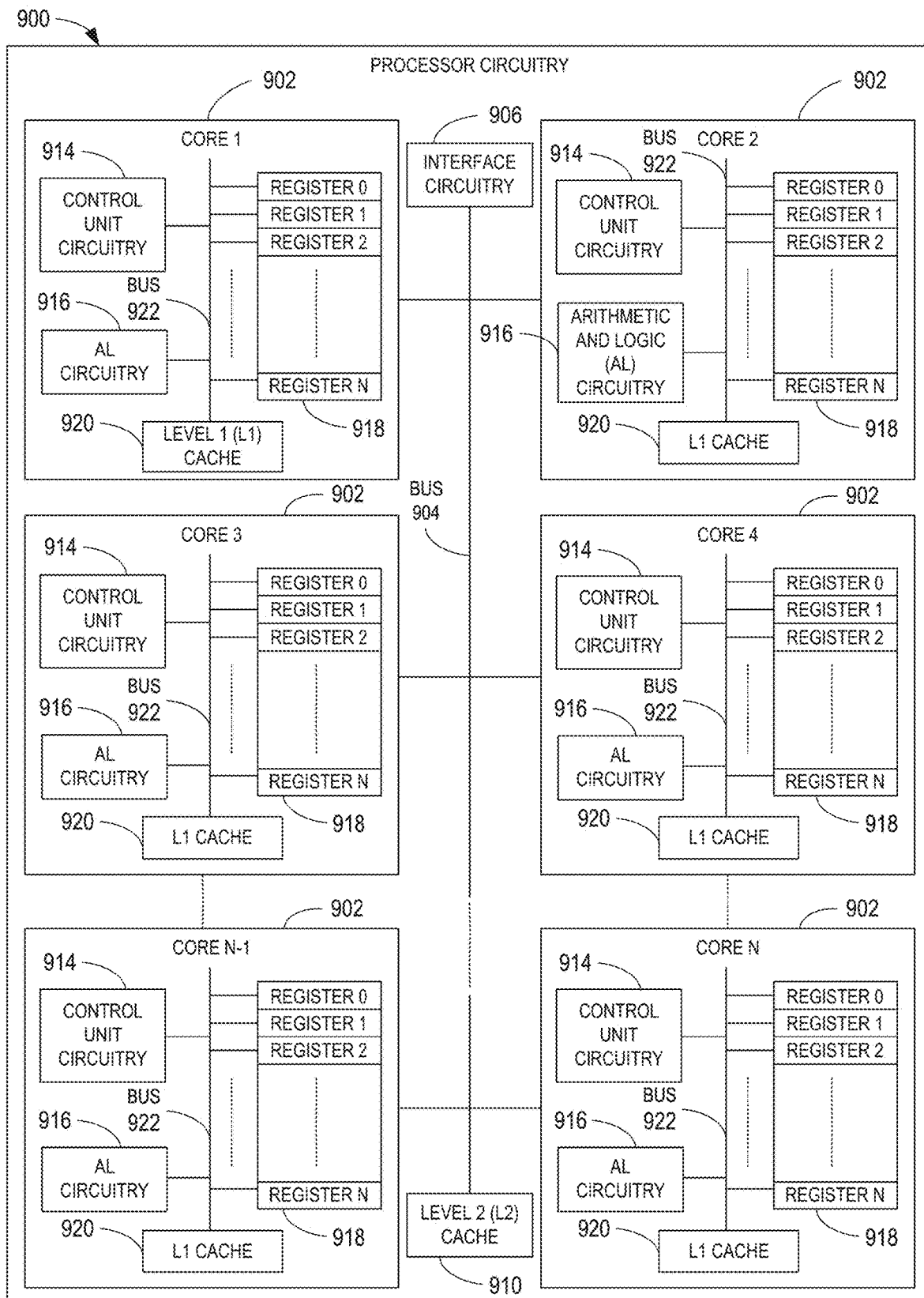
FIG. 9 is a block diagram of an example implementation of the processor circuitry of FIG. 8.

FIG. 9 is a block diagram of an example implementation of the processor circuitry 812 of FIG. 8. In this example, the processor circuitry 812 of FIG. 8 is implemented by a microprocessor 900. For example, the microprocessor 900 may implement multi-core hardware circuitry such as a CPU, a DSP, a GPU, an XPU, etc. Although it may include any number of example cores 902 (e.g., 1 core), the microprocessor 900 of this example is a multi-core semiconductor device including N cores. The cores 902 of the microprocessor 900 may operate independently or may cooperate to execute machine readable instructions. For example, machine code corresponding to a firmware program, an embedded software program, or a software program may be executed by one of the cores 902 or may be executed by multiple ones of the cores 902 at the same or different times. In some examples, the machine code corresponding to the firmware program, the embedded software program, or the software program is split into threads and executed in parallel by two or more of the cores 902. The software program may correspond to a portion or all of the machine readable instructions and/or operations represented by the flowcharts of FIGS. 5, 6, and/or 7.

The cores 902 may communicate by an example bus 904. In some examples, the bus 904 may implement a communication bus to effectuate communication associated with one(s) of the cores 902. For example, the bus 904 may implement at least one of an Inter-Integrated Circuit (I2C) bus, a Serial Peripheral Interface (SPI) bus, a PCI bus, or a PCIe bus. Additionally or alternatively, the bus 904 may implement any other type of computing or electrical bus. The cores 902 may obtain data, instructions, and/or signals from one or more external devices by example interface circuitry 906. The cores 902 may output data, instructions, and/or signals to the one or more external devices by the interface circuitry 906. Although the cores 902 of this example include example local memory 920 (e.g., Level 1 (L1) cache that may be split into an L1 data cache and an L1 instruction cache), the microprocessor 900 also includes example shared memory 910 that may be shared by the cores (e.g., Level 2 (L2_cache)) for high-speed access to data and/or instructions. Data and/or instructions may be transferred (e.g., shared) by writing to and/or reading from the shared memory 910. The local memory 920 of each of the cores 902 and the shared memory 910 may be part of a hierarchy of storage devices including multiple levels of cache memory and the main memory (e.g., the main memory 814, 816 of FIG. 8). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 902 may be referred to as a CPU, DSP, GPU, etc., or any other type of hardware circuitry. Each core 902 includes control unit circuitry 914, arithmetic and logic (AL) circuitry (sometimes referred to as an ALU) 916, a plurality of registers 918, the L1 cache 920, and an example bus 922. Other structures may be present. For example, each core 902 may include vector unit circuitry, single instruction multiple data (SIMD) unit circuitry, load/store unit (LSU) circuitry, branch/jump unit circuitry, floating-point unit (FPU) circuitry, etc. The control unit circuitry 914 includes semiconductor-based circuits structured to control (e.g., coordinate) data movement within the corresponding core 902. The AL circuitry 916 includes semiconductor-based circuits structured to perform one or more mathematic and/or logic operations on the data within the corresponding core 902. The AL circuitry 916 of some examples performs integer based operations. In other examples, the AL circuitry 916 also performs floating point operations. In yet other examples, the AL circuitry 916 may include first AL circuitry that performs integer based operations and second AL circuitry that performs floating point operations. In some examples, the AL circuitry 916 may be referred to as an Arithmetic Logic Unit (ALU). The registers 918 are semiconductor-based structures to store data and/or instructions such as results of one or more of the operations performed by the AL circuitry 916 of the corresponding core 902. For example, the registers 918 may include vector register(s), SIMD register(s), general purpose register(s), flag register(s), segment register(s), machine specific register(s), instruction pointer register(s), control register(s), debug register(s), memory management register(s), machine check register(s), etc. The registers 918 may be arranged in a bank as shown in FIG. 9. Alternatively, the registers 918 may be organized in any other arrangement, format, or structure including distributed throughout the core 902 to shorten access time. The bus 904 may implement at least one of an I2C bus, a SPI bus, a PCI bus, or a PCIe bus Each core 902 and/or, more generally, the microprocessor 900 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 900 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or more efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 10:
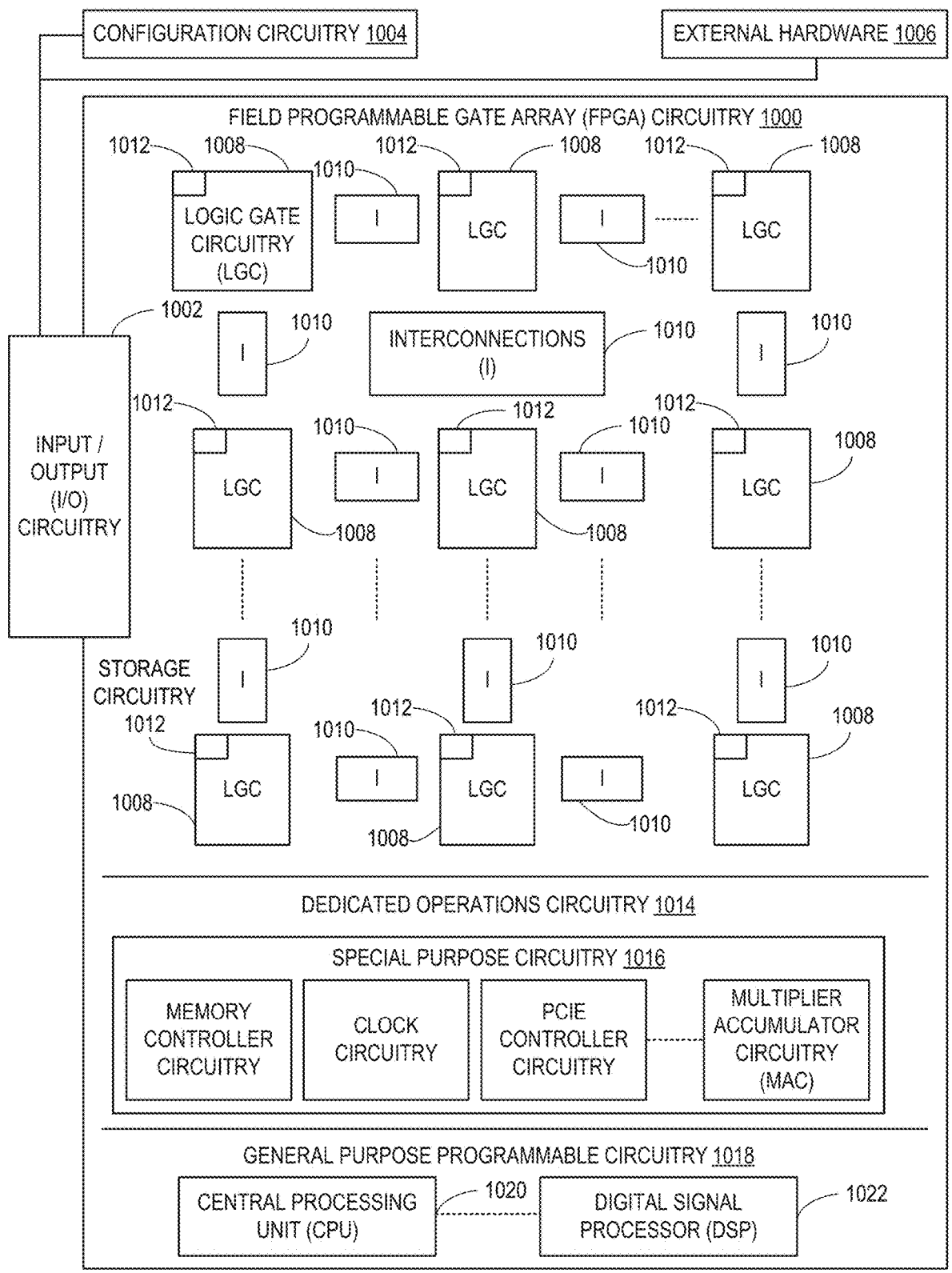
FIG. 10 is a block diagram of another example implementation of the processor circuitry of FIG. 8

FIG. 10 is a block diagram of another example implementation of the processor circuitry 812 of FIG. 8. In this example, the processor circuitry 812 is implemented by FPGA circuitry 1000. The FPGA circuitry 1000 can be used, for example, to perform operations that could otherwise be performed by the example microprocessor 900 of FIG. 9 executing corresponding machine readable instructions. However, once configured, the FPGA circuitry 1000 instantiates the machine readable instructions in hardware and, thus, can often execute the operations faster than they could be performed by a general purpose microprocessor executing the corresponding software.

More specifically, in contrast to the microprocessor 900 of FIG. 9 described above (which is a general purpose device that may be programmed to execute some or all of the machine readable instructions represented by the flowcharts of FIGS. 5, 6, and/or 7 but whose interconnections and logic circuitry are fixed once fabricated), the FPGA circuitry 1000 of the example of FIG. 10 includes interconnections and logic circuitry that may be configured and/or interconnected in different ways after fabrication to instantiate, for example, some or all of the machine readable instructions represented by the flowcharts of FIGS. 5, 6, and/or 7. In particular, the FPGA 1000 may be thought of as an array of logic gates, interconnections, and switches. The switches can be programmed to change how the logic gates are interconnected by the interconnections, effectively forming one or more dedicated logic circuits (unless and until the FPGA circuitry 1000 is reprogrammed). The configured logic circuits enable the logic gates to cooperate in different ways to perform different operations on data received by input circuitry. Those operations may correspond to some or all of the software represented by the flowcharts of FIGS. 5, 6, and/or 7. As such, the FPGA circuitry 1000 may be structured to effectively instantiate some or all of the machine readable instructions of the flowcharts of FIGS. 5, 6, and/or 7 as dedicated logic circuits to perform the operations corresponding to those software instructions in a dedicated manner analogous to an ASIC. Therefore, the FPGA circuitry 1000 may perform the operations corresponding to some or all of the machine readable instructions of FIGS. 5, 6, and/or 7 faster than the general purpose microprocessor can execute the same.

In the example of FIG. 10, the FPGA circuitry 1000 is structured to be programmed (and/or reprogrammed one or more times) by an end user by a hardware description language (HDL) such as Verilog. The FPGA circuitry 1000 of FIG. 10, includes example input/output (I/O) circuitry 1002 to obtain and/or output data to/from example configuration circuitry 1004 and/or external hardware (e.g., external hardware circuitry) 1006. For example, the configuration circuitry 1004 may implement interface circuitry that may obtain machine readable instructions to configure the FPGA circuitry 1000, or portion(s) thereof. In some such examples, the configuration circuitry 1004 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1006 may implement the microprocessor 900 of FIG. 9. The FPGA circuitry 1000 also includes an array of example logic gate circuitry 1008, a plurality of example configurable interconnections 1010, and example storage circuitry 1012. The logic gate circuitry 1008 and interconnections 1010 are configurable to instantiate one or more operations that may correspond to at least some of the machine readable instructions of FIGS. 5, 6, and/or 7 and/or other desired operations. The logic gate circuitry 1008 shown in FIG. 10 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1008 to enable configuration of the electrical structures and/or the logic gates to form circuits to perform desired operations. The logic gate circuitry 1008 may include other electrical structures such as look-up tables (LUTs), registers (e.g., flip-flops or latches), multiplexers, etc.

The interconnections 1010 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1008 to program desired logic circuits.

The storage circuitry 1012 of the illustrated example is structured to store result(s) of the one or more of the operations performed by corresponding logic gates. The storage circuitry 1012 may be implemented by registers or the like. In the illustrated example, the storage circuitry 1012 is distributed amongst the logic gate circuitry 1008 to facilitate access and increase execution speed.

The example FPGA circuitry 1000 of FIG. 10 also includes example Dedicated Operations Circuitry 1014. In this example, the Dedicated Operations Circuitry 1014 includes special purpose circuitry 1016 that may be invoked to implement commonly used functions to avoid the need to program those functions in the field. Examples of such special purpose circuitry 1016 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1000 may also include example general purpose programmable circuitry 1018 such as an example CPU 1020 and/or an example DSP 1022. Other general purpose programmable circuitry 1018 may additionally or alternatively be present such as a GPU, an XPU, etc., that can be programmed to perform other operations.

Although FIGS. 9 and 10 illustrate two example implementations of the processor circuitry 812 of FIG. 8, many other approaches are contemplated. For example, as mentioned above, modern FPGA circuitry may include an on-board CPU, such as one or more of the example CPU 1020 of FIG. 10. Therefore, the processor circuitry 812 of FIG. 8 may additionally be implemented by combining the example microprocessor 900 of FIG. 9 and the example FPGA circuitry 1000 of FIG. 10. In some such hybrid examples, a first portion of the machine readable instructions represented by the flowcharts of FIGS. 5, 6, and/or 7 may be executed by one or more of the cores 902 of FIG. 9 and a second portion of the machine readable instructions represented by the flowcharts of FIGS. 5, 6, and/or 7 may be executed by the FPGA circuitry 1000 of FIG. 10.

In some examples, the processor circuitry 812 of FIG. 8 may be in one or more packages. For example, the processor circuitry 900 of FIG. 9 and/or the FPGA circuitry 1000 of FIG. 10 may be in one or more packages. In some examples, an XPU may be implemented by the processor circuitry 812 of FIG. 8, which may be in one or more packages. For example, the XPU may include a CPU in one package, a DSP in another package, a GPU in yet another package, and an FPGA in still yet another package.

Figure 11:
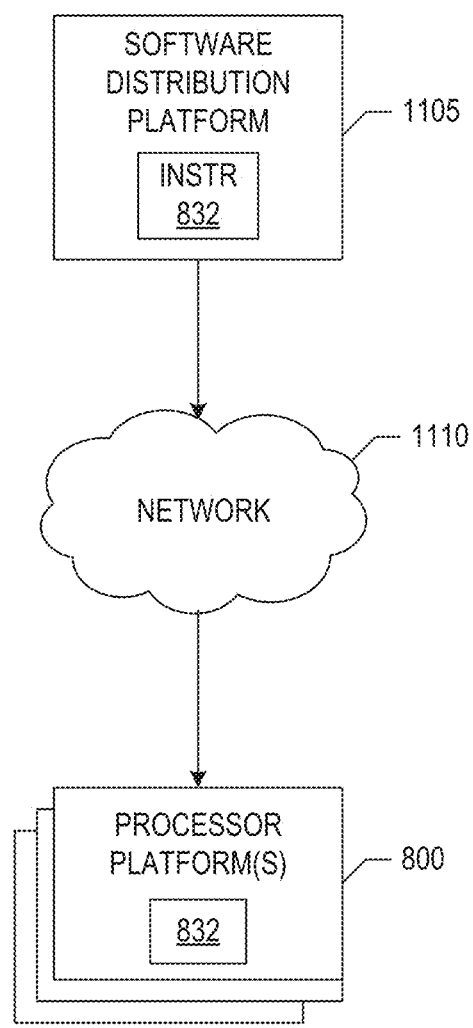
FIG. 11 is a block diagram of an example software distribution platform (e.g., one or more servers) to distribute software (e.g., software corresponding to the example machine readable instructions of FIGS. 5, 6 and/or 7) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1105 to distribute software such as the example machine readable instructions 832 of FIG. 8 to hardware devices owned and/or operated by third parties is illustrated in FIG. 11. The example software distribution platform 1105 may be implemented by any computer server, data facility, cloud service, etc., capable of storing and transmitting software to other computing devices. The third parties may be customers of the entity owning and/or operating the software distribution platform 1105. For example, the entity that owns and/or operates the software distribution platform 1105 may be a developer, a seller, and/or a licensor of software such as the example machine readable instructions 832 of FIG. 8. The third parties may be consumers, users, retailers, OEMs, etc., who purchase and/or license the software for use and/or re-sale and/or sub-licensing. In the illustrated example, the software distribution platform 1105 includes one or more servers and one or more storage devices. The storage devices store the machine readable instructions 832, which may correspond to the example machine readable instructions 832 of FIG. 8, as described above. The one or more servers of the example software distribution platform 1105 are in communication with a network 1110, which may correspond to any one or more of the Internet and/or any of the example networks 120 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 832 from the software distribution platform 1105. For example, the software, which may correspond to the example machine readable instructions 832 of FIG. 8, may be downloaded to the example processor platform 800, which is to execute the machine readable instructions 832 to implement the example reference signature asset generation system 112. In some example, one or more servers of the software distribution platform 1105 periodically offer, transmit, and/or force updates to the software (e.g., the example machine readable instructions 832 of FIG. 8) to ensure improvements, patches, updates, etc., are distributed and applied to the software at the end user devices.

From the foregoing, it will be appreciated that example systems, methods, apparatus, and articles of manufacture have been disclosed that generate reference signature assets from meter signatures. The disclosed systems, methods, apparatus, and articles of manufacture improve the efficiency of using a computing device by creating reference signature assets from meter signatures when a full reference signature asset does not exist for a reference media, thus being unable to credit viewing for that reference media. The disclosed systems, methods, apparatus, and articles of manufacture are accordingly directed to one or more improvement(s) in the operation of a machine such as a computer or other electronic and/or mechanical device.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. A computing system comprising:
a processor; and
a non-transitory computer-readable storage medium, having stored thereon program instructions that, upon execution by the processor, cause performance of a set of operations comprising:
comparing a meter signature string with a search signature string to identify a fragment match result,
wherein the search signature string comprises metadata,
wherein the metadata comprises a length of a media associated with the search signature string, a start time of the search signature string, and an end time of the search signature string, and
wherein the fragment match result is associated with a sequence position within the media based on the length of the media and the start time and end time of the search signature string;
generating, by executing an instruction with at least one processor, a candidate signature asset from the meter signature string based on the sequence position and the length of the media by:
identifying a media window of the meter signature string based on the sequence position represented by the search signature string included in the fragment match result and the length of the media; and
extracting the candidate signature asset from the meter signature string based on the identified media window of the meter signature string;
storing the candidate signature asset in a candidate pool associated with the media when the fragment match result is identified; and
identifying, by executing an instruction with the at least one processor, a reference signature asset from the candidate pool to represent the media.

2. The computing system of claim 1, wherein the extracted candidate signature asset is longer than the length of the media.

3. The computing system of claim 1, the set of operations further comprising:
comparing candidate signature assets in the candidate pool to form one or more match groups;
selecting a representative match group for the candidate pool from the one or more match groups; and
selecting a representative reference signature asset from the representative match group when the representative match group satisfies a threshold.

4. The computing system of claim 3, the set of operations further comprising:
stopping the comparing of remaining candidate signature assets in the candidate pool in response to a determination that a match is unable to cause the one or more match groups to satisfy the threshold.

5. The computing system of claim 3, the set of operations further comprising:
modifying the selected reference signature asset when there are one or more fragments of the reference signature asset that do not match with the candidate signature assets in the match group of the candidate pool the selected reference signature asset was selected from, the modification to occur at the one or more fragments that do not match.

6. The computing system of claim 3, the set of operations further comprising:
repeating the comparing of the candidate signature assets, the selecting of the representative match group, and the selecting of the representative reference signature asset when the candidate pool is modified.

7. A non-transitory computer-readable storage medium, having stored thereon program instructions that, upon execution by a processor, cause performance of a set of operations comprising:
comparing a meter signature string with a search signature string to identify a fragment match result,
wherein the search signatures string comprises metadata,
wherein the metadata comprises a length of a media associated with the search signature string, a start time of the search signature string, and an end time of the search signature string, and
wherein the fragment match result is associated with a sequence position within the media based on the length of the media and the start time and end time of the search signature string;
generating a candidate signature asset from the meter signature string based on the sequence position and the length of the media by:
identifying a media window of the meter signature string based on the sequence position represented by the search signature string included in the fragment match result and the length of the media;
storing the candidate signature asset in a candidate pool associated with the media when the fragment match result is identified; and
identifying a reference signature asset from the candidate pool to represent the media.

8. The non-transitory computer-readable storage medium as defined in claim 7, the set of operations further comprising:
selecting the meter signature string from a plurality of meter signature strings; and
wherein the generating the candidate signature asset further comprises
extracting the candidate signature asset from the meter signature string based on the identified media window of the meter signature string.

9. The non-transitory computer-readable storage medium as defined in claim 8, wherein the extracted candidate signature asset is longer than the length of the media.

10. The non-transitory computer-readable storage medium as defined in claim 7, the set of operations further comprising:
comparing candidate signature assets in the candidate pool to form one or more match groups;
selecting a representative match group for the candidate pool from the one or more match groups; and
selecting a representative reference signature asset from the representative match group when the representative match group satisfies a threshold.

11. The non-transitory computer-readable storage medium as defined in claim 10, the set of operations further comprising:
stopping the comparing of remaining candidate signature assets in the candidate pool in response to a determination that a match is unable to cause the one or more match groups to satisfy the threshold.

12. The non-transitory computer-readable storage medium as defined in claim 10, the set of operations further comprising:
modifying the selected reference signature asset when there are one or more fragments of the reference signature asset that do not match with the candidate signature assets in the match group of the candidate pool the selected reference signature asset was selected from, the modification to occur at the one or more fragments that do not match.

13. The non-transitory computer-readable storage medium as defined in claim 10, the set of operations further comprising:
repeating the comparing of the candidate signature assets, the selecting of the representative match group, and the selecting of the representative reference signature asset when the candidate pool is modified.

14. A method comprising:
comparing a meter signature string with a search signature string to identify a fragment match result,
wherein the search signature string comprises metadata,
wherein the metadata comprises a length of a media associated with the search signature string, a start time of the search signature string, and an end time of the search signature string, and
wherein the fragment match result is associated with a sequence position within the media based on the length of the media and the start time and end time of the search signature string;
generating, by executing an instruction with at least one processor, a candidate signature asset from the meter signature string based on the sequence position and the length of the media by:
extracting the candidate signature asset from the meter signature string based on an identified media window of the meter signature string;
storing the candidate signature asset in a candidate pool associated with the media when the fragment match result is identified; and
identifying, by executing an instruction with the at least one processor, a reference signature asset from the candidate pool to represent the media.

15. The method of claim 14, further comprising:
selecting the meter signature string from a plurality of meter signature strings; and
wherein the generating of the candidate signature asset comprises:
identifying the media window of the meter signature string based on the sequence position represented by the search signature string included in the fragment match result and the length of the media.

16. The method of claim 14, wherein the extracted candidate signature asset is longer than the length of the media.

17. The method of claim 14, further comprising:
comparing candidate signature assets in the candidate pool to form one or more match groups;
selecting a representative match group for the candidate pool from the one or more match groups; and
selecting a representative reference signature asset from the representative match group when the representative match group satisfies a threshold.

18. The method of claim 17, further comprising:
stopping the comparing of remaining candidate signature assets in the candidate pool in response to a determining that a match is unable to cause the one or more match groups to satisfy the threshold.

19. The method of claim 17, further comprising:
modifying the selected reference signature asset when there are one or more fragments of the reference signature asset that do not match with the candidate signature assets in the match group of the candidate pool the selected reference signature asset was selected from, the modifying occurring at the one or more fragments that do not match.

20. The computing system of claim 1, the set of operations further comprising:
selecting the meter signature string from a plurality of meter signature strings.

* * * * *